Nov. 23, 1943.   C. S. ASH   2,334,692
DUAL WHEEL BRAKE
Filed July 19, 1941   6 Sheets-Sheet 6
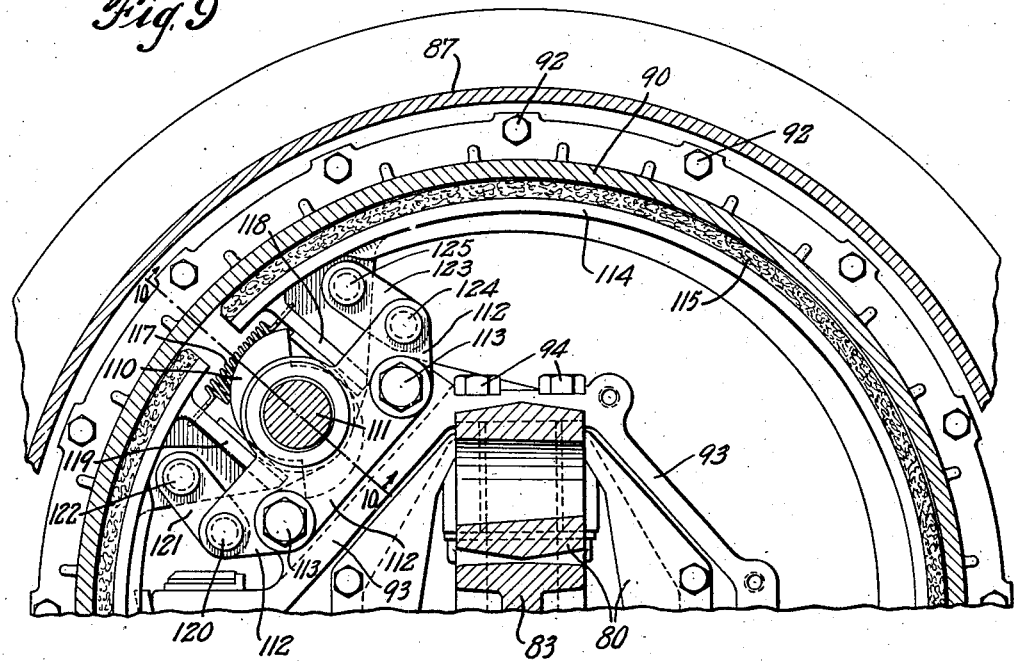
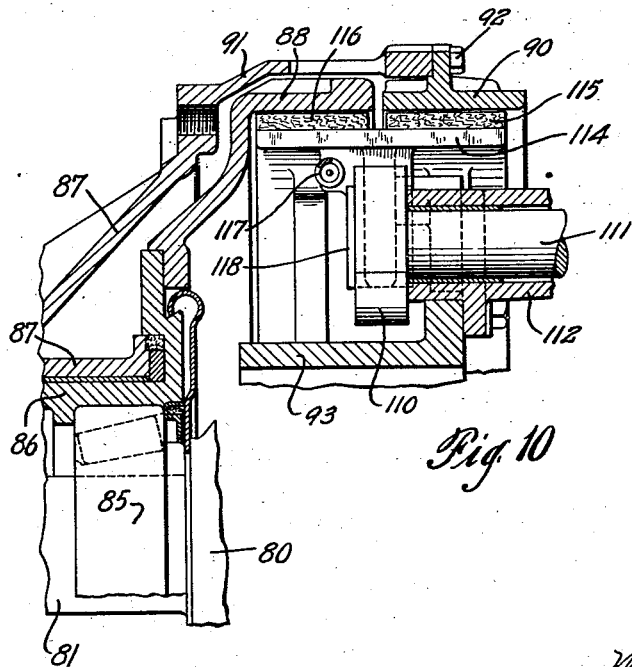
INVENTOR:
CHARLES S. ASH
BY
Morgan, Finnegan & Durham
ATTORNEYS.

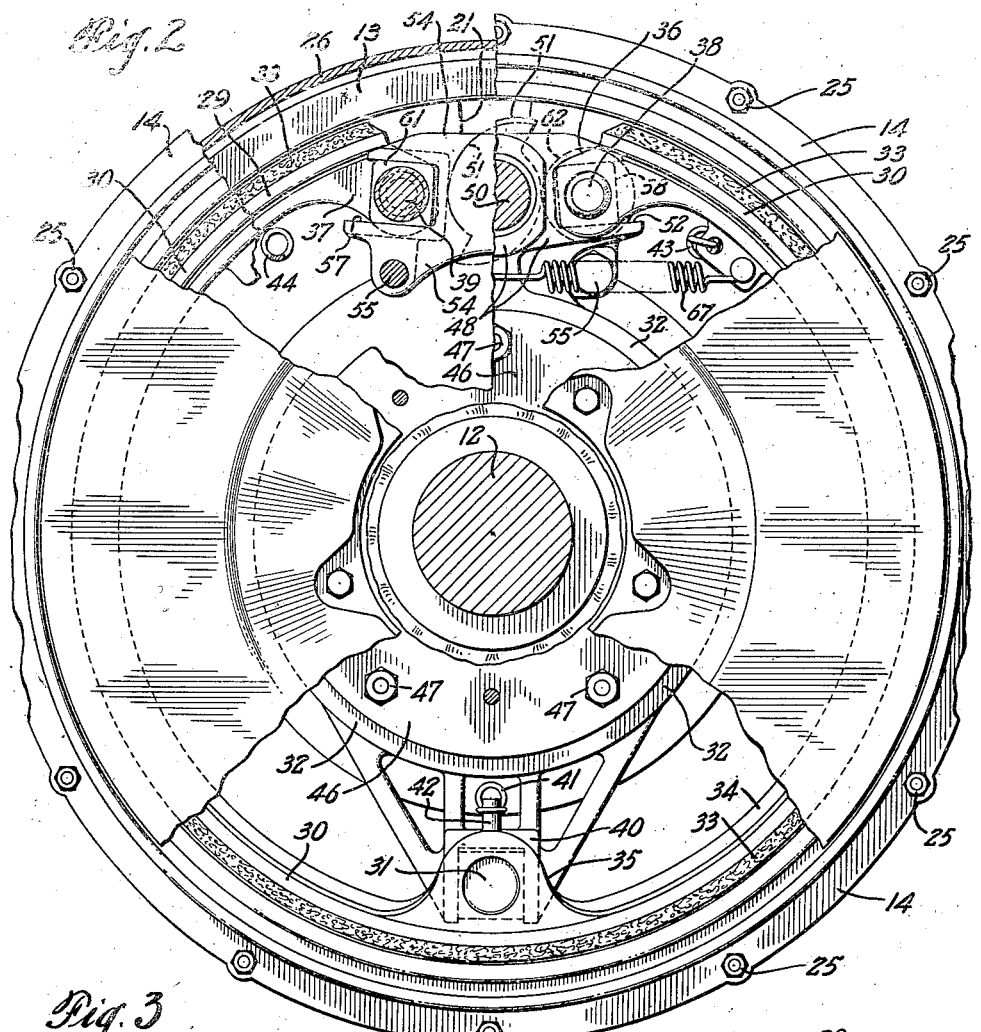
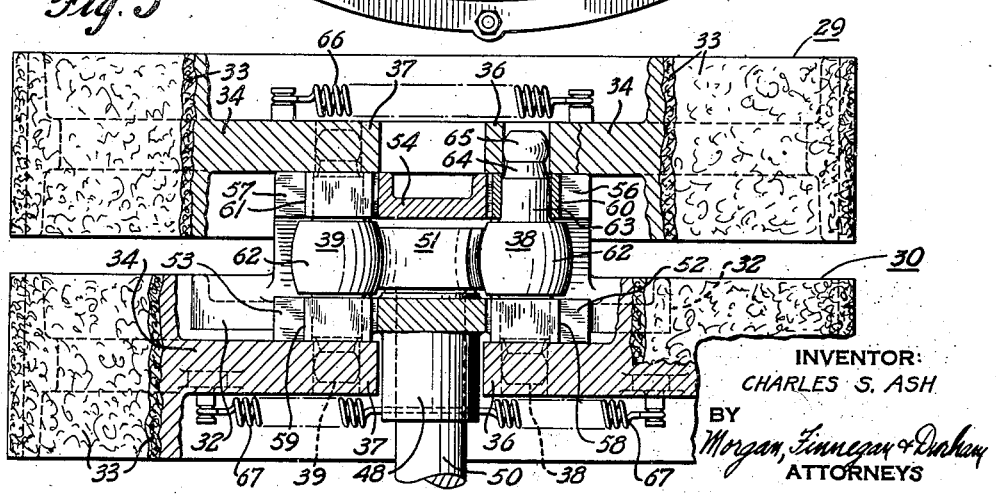

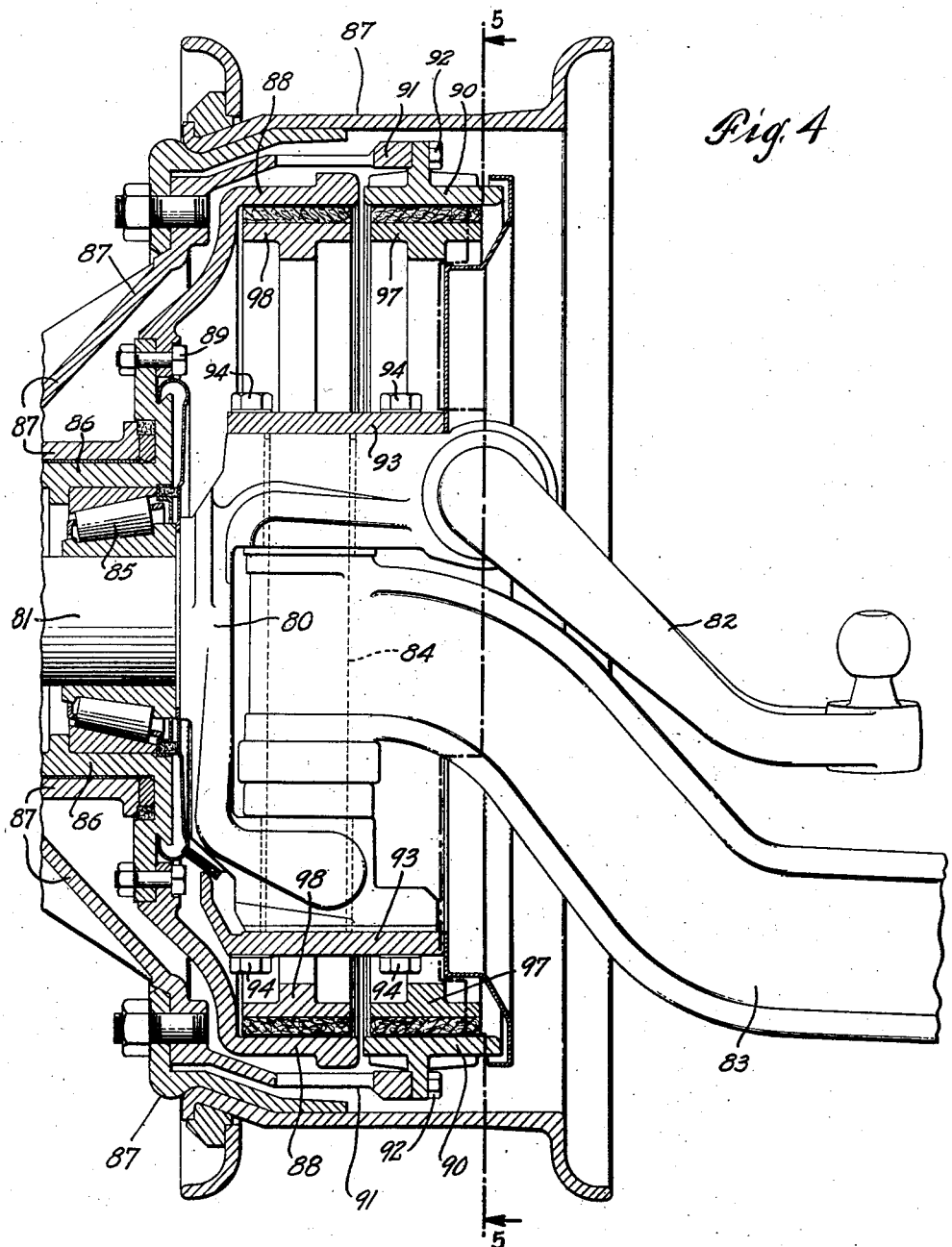

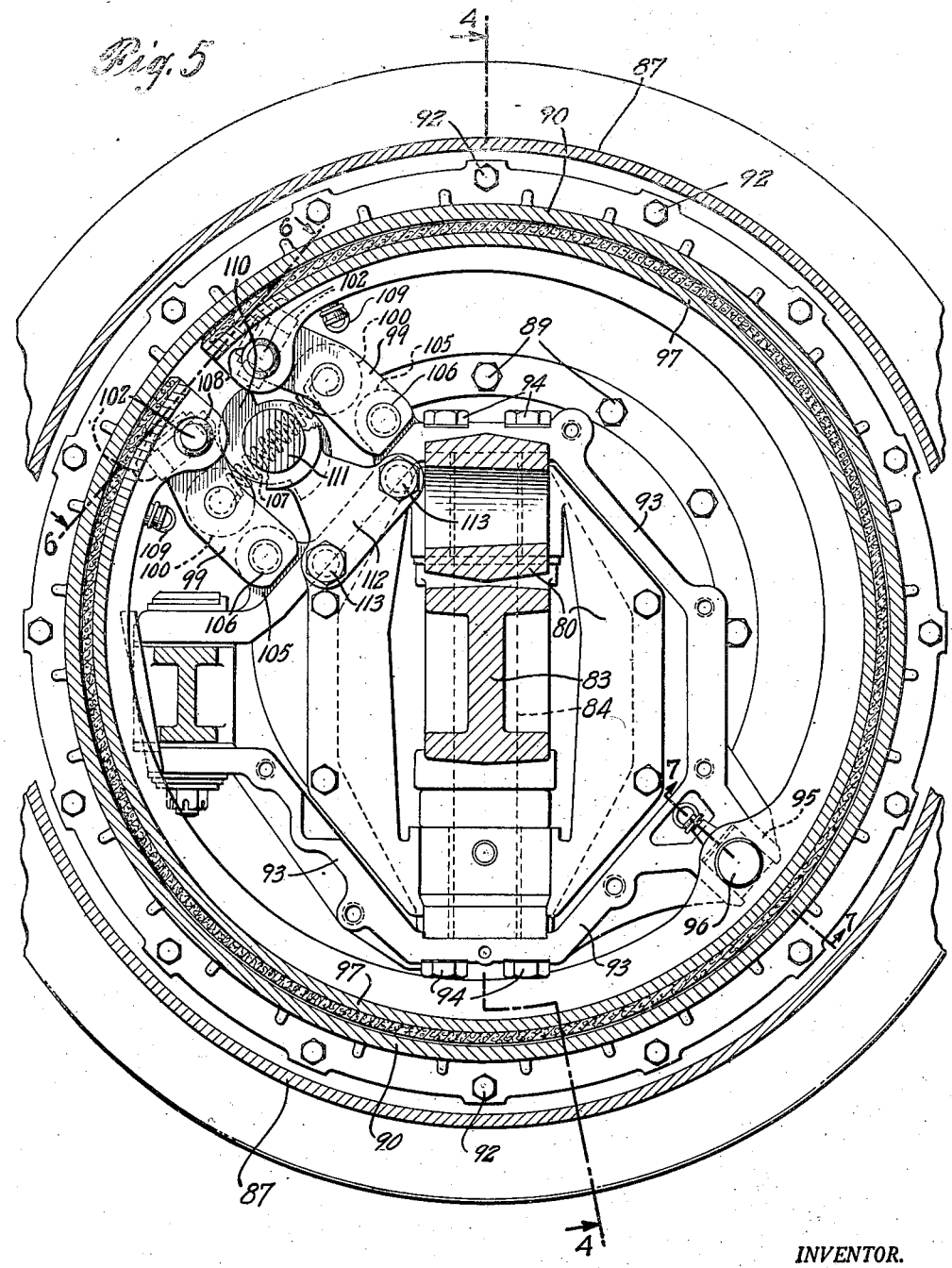

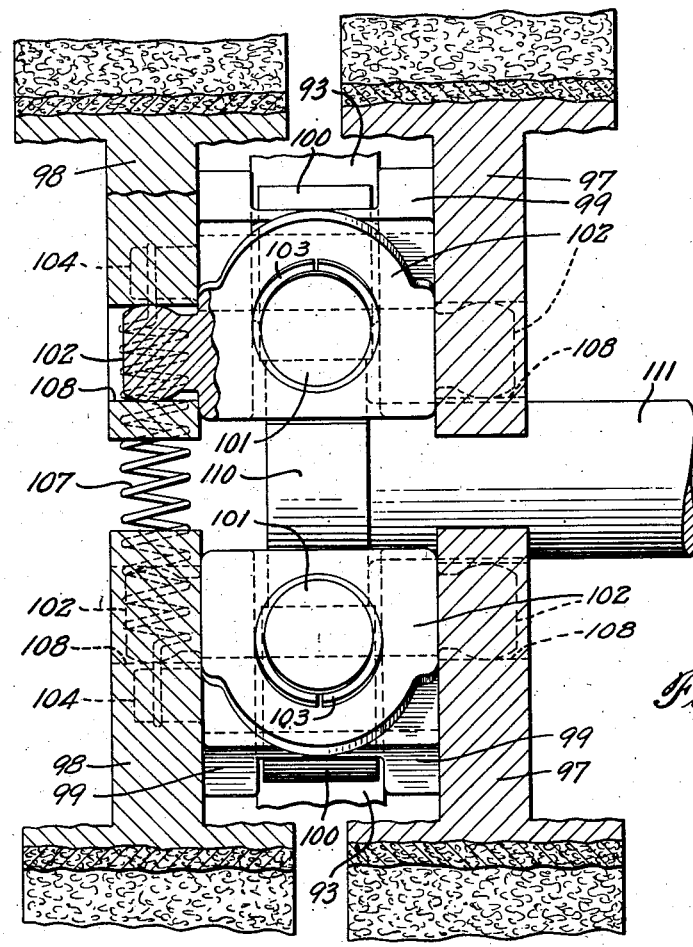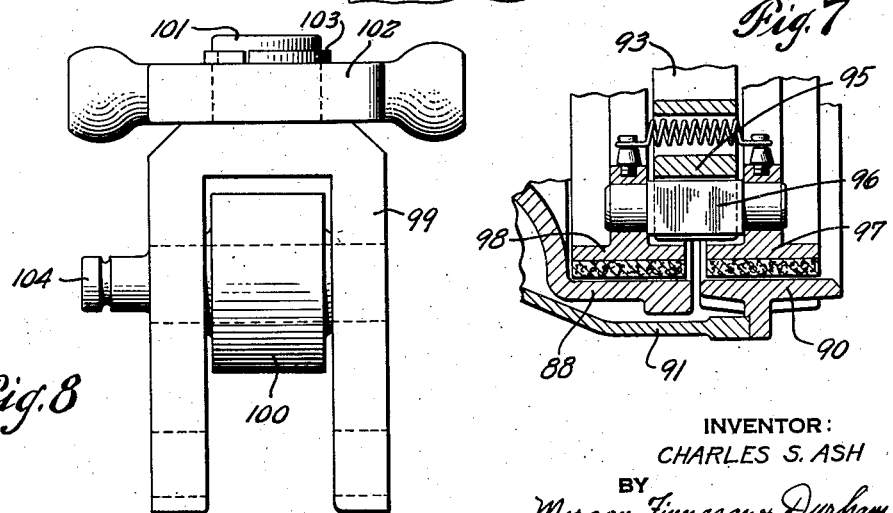

Patented Nov. 23, 1943

2,334,692

UNITED STATES PATENT OFFICE 2,334,692

DUAL WHEEL BRAKE

Charles S. Ash, Milford, Mich.

Application July 19, 1941, Serial No. 403,097

9 Claims. (Cl. 188—18)

This invention relates to vehicle wheel assemblies and relates more particularly to improvements in brake mechanism therefor.

An object of this invention is to provide an improved brake mechanism for wheel assemblies both single and dual.

Another object of this invention is to provide a brake mechanism in which the brake band or shoe will be maintained in a true circle at whatever diameter it is expanded, thereby providing continuous and uniform contact substantially all around the drum.

Another object of this invention is to provide a more efficient and durable brake mechanism having high performance characteristics.

Another object of this invention is to provide a brake mechanism having an increased braking area and characterized by freedom from high pressure points and by cooler running.

Another object of this invention is to provide a brake mechanism for dirigible wheel assemblies in which the brake shoe structure is characterized by improved inside diameter clearance permitting the brake mechanism to be assembled or mounted directly over the steering knuckles and other internal spindle parts without interference and thereby obtaining improved turning radius for the wheels.

Another object of this invention is to provide a brake mechanism through which effective and substantial increase of brake lining area is obtained through increase of the width rather than of the diameter of the brake mechanism.

Another object of this invention is to provide a brake mechanism for dual wheel assemblies which the respective brake drums will expand or behave similarly in service and during various conditions of heat which cause continuous expansion and contraction.

Other and further objects of this invention will appear from the following description, the accompanying drawings and the appended claims.

In the accompanying drawings which form part of the instant specification and are to be read in conjunction therewith and in which like numbers refer to like parts throughout the several views:

Fig. 2 is a view in rear elevation with parts cut away of a portion of the wheel assembly of Fig. 1 showing the arrangement of the various elements of the brake mechanism;

Fig. 3 is a view in top plan with parts cut away of the brake bands and brake equalizer mechanism of Fig. 2;

Fig. 4 is a side sectional view taken on the line 4—4 of Figure 5 and showing a modification as applied to a dirigible dual wheel assembly;

Fig. 5 is a view in section taken along the line 5—5 of Fig. 4;

Fig. 6 is a view in section taken along the line 6—6 of Fig. 5;

Fig. 7 is a view in section taken along the line 7—7 of Fig. 5;

Fig. 8 is a view in side elevation of a detail of Fig. 5;

Fig. 9 is a fragmentary sectional view in rear elevation of another modification of this invention; and, Fig. 10 is a view in section taken along the line 10—10 of Fig. 9.

Figure 1:
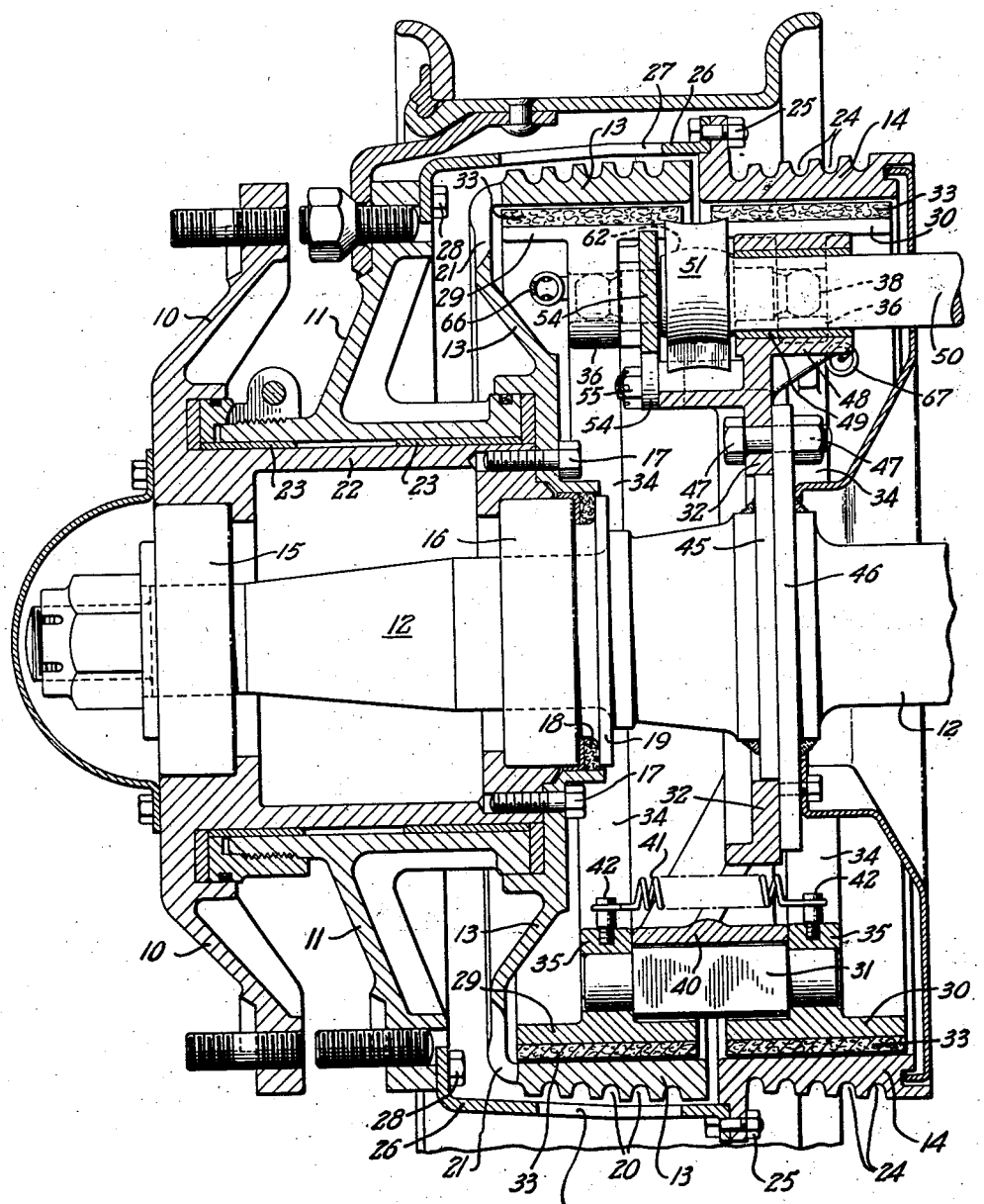
Fig. 1 is a side sectional view in elevation of a preferred embodiment of this invention as applied to a dual wheel assembly.

In general, this invention, as embodied, is characterized by the provision in a vehicle wheel assembly of a brake band or bands adapted to be expanded within one or more brake drums as the case may be so as to be maintained in more nearly a perfect circle. This result is accomplished by supporting the band diametrically opposite its spaced adjacent ends so that it may move radially as its ends are spread apart to obtain expansion of the band. The spaced ends are guided in their expansion movement by suitable link mechanism which causes the band ends to follow outwardly diverging paths rather than the usual outwardly oppositely extending paths. A more uniform engagement of the brake band with the brake drum is thus obtained and the braking efficiency materially increased.

This type construction is clearly adapted for use with either single or dual wheels. In the latter, side-by-side brake drums cooperate with side-by-side brake bands which are preferably interconnected by means of brake equalizers adapted to distribute the braking effort equally between the wheels. The brake equalizers, as embodied, are preferably pivotally connected at either end to the brake bands so that a centrally applied actuating force may be distributed equally between the bands through angular adjustment of the equalizers. With side-by-side drums, the tendency of the inner drum to expand more than the outer drum may be overcome in a large measure by cutting away a portion of the outer drum adjacent its supported edge. In the same manner, the tendency of a wide drum to "bell-mouth" may be overcome by cutting away the supporting web of the drum.

Thus, this invention provides a construction which will enable the brake band to preserve a more nearly perfect circular contour at varying diameters of expansion, and at the same time provides compensation for unequal expansion tendencies of side-by-side drums, or drums of unusual width. Hence, the use of a single wide brake band with side-by-side drums becomes feasible since balanced braking effort across the width of the drum is obtainable.

Referring now more particularly to the accompanying drawings and to Figs. 1, 2 and 3 thereof depicting a preferred embodiment of this invention which comprises, as there shown, a pair of independently rotatable wheels 10 and 11 mounted for rotation upon an axle 12 and provided with side-by-side brake drums 13 and 14, respectively. The wheel 10 is carried on spaced anti-friction bearings 15 and 16 on the axle 12 and carries at its inner end the brake drum 13 which is removably secured thereto by means of stud bolts 17. An oil ring 18 is interposed between the bearing 16 and an annular flange 19 on the axle 12.

The brake drum 13 is circumferentially grooved as at 20 to improve cooling and is provided with apertures or cutaway portions 21 which are sufficient in number to permit an expansion of the drum in operation more nearly equal to that of the drum 14. Thus, a more balanced braking action is obtainable as will more fully appear hereinafter.

The inner wheel 11 is carried by the hub 22 of the wheel 10 upon which it is journalled on sleeve bearings 23 of anti-friction material.

The brake drum 14 which is circumferentially grooved as at 24 to promote cooling is secured by fastenings 25 to an annular member 26 provided with ventilating ports 27 which in turn is secured by bolts 28 to the wheel 11.

Side-by-side brake bands 29 and 30, respectively, are positioned in operative relation to the brake drums 13 and 14, respectively, each being pivotally supported upon a follower member 31 slidably engaging a brake support member 32 carried by the axle 12.

The brake bands 29 and 30 are duplicates of each other and are substantially continuous. Each is provided with a brake lining 33 riveted thereto in the usual fashion and is internally reinforced by an outstanding flange 34.

The flanges 34 of the respective brake bands 29 and 30 are respectively provided with an enlarged apertured portion 35 equidistant from either end of the band and forming a bearing of cylindrical contour by which the bands are pivotally mounted on either end of the follower 31. The extremities 36—37 of each reinforcing flange are apertured to provide bearings of cylindrical contour in which the ends of equalizer members 38 and 39 are lodged.

The follower member 31 is of square cross section throughout the major portion of its length and is slidably received within a slotted arm 40 of the brake support member 32 so as to permit inward and outward movement of the follower member radially of the wheel assembly. The ends of the follower member are of cylindrical contour and form trunnions extending into the apertured portions 35 of the brake bands. A helical spring 41 is engaged at either end with studs 42 threadedly engaging the respective bands and substantially inhibits movement of the bands axially away from each other. Springs 43 and 44, respectively, coupling the bands adjacent their extremities perform a similar function at the ends of the bands.

The brake support member 32, as here embodied, is centrally apertured so as to receive snugly therewithin an annular flange 45 of the axle 12 and is bolted to an annular flange 46 of the axle by means of the fastenings 47.

The mechanism for expanding the brake bands and for guiding the opposed ends of each in outwardly diverging paths is carried, in part at least, by the brake support member 32. As here embodied, the brake support member 32 is formed with an outstanding member 48 provided with a sleeve bearing 49 in which is journalled the shaft 50 of a brake actuating cam 51.

The member 48 as shown has a plane of symmetry passing through the axes of the axle 12 and cam shaft 50. Situated at either side of this plane of symmetry and located in the member 48 is a pair of guide slots 52 and 53 which are identical in contour and have parallel planar upper and lower surfaces, the corresponding surfaces lying in respective planes which intersect each other at equal small angles of e. g. four degrees, to a horizontal plane passing through the center of the cam shaft 50. Thus, the slots 52—53 diverge outwardly and upwardly from each other.

A member 54 is bolted to the member 48 by fasteners 55 and is provided with a pair of guide slots 56 and 57 positioned at either side of the plane of symmetry and having parallel planar upper and lower surfaces in alignment with the corresponding surfaces of the slots 52 and 53.

Director members 58 to 61 inclusive in the form of apertured guide blocks having planar parallel upper and lower surfaces lie in the slots 52, 53, 56 and 57, respectively, by which they are confined for sliding movement axially of the respective slots.

The equalizer members 38 and 39 are identical with each other. Thus, the member 38 consists of a central portion 62 of spherical contour adapted to be engaged by a correspondingly contoured surface portion of one lobe of the two lobed cam 51. Extending outwardly from the central portion in either direction is a shaft portion 63 of cylindrical contour which is journalled in the guide block 60, for example. Each shaft portion 63 is joined by a uniformly tapered portion 64 to a tip portion 65 of reduced diameter and of spherical contour which fits within one apertured extremity of one brake band, e. g. the apertured extremity 36 of the brake band 29. The tapered portion of the equalizer member provides for sufficient clearance between it and the aperture rim to permit the equalizer 38, for example, to pivot on an axis perpendicular to the plane of the guide slot walls 52 and 56 so that an unequal braking effort may be equalized between the two bands. Thus, it will be observed that the equalizer member 38 is lodged for universal movement in the apertured extremities 36 of the brake bands 29 and 30; and, that the equalizer 39 is similarly lodged in the apertured extremities 37.

Helical springs 66 and 67 connected to the bands 29 and 30, respectively, are provided to restore the bands to their normal position after expansion.

In the operation of the device shown in Figs. 1-3 inclusive, the cam shaft 50 may be rotated by any suitable manual or power operated means to rotate the cam 51 whose lobes will force the equalizer members apart from each other thereby to impart a braking effort to the brake bands 29 and 30. As the equalizer bars travel outwardly, they are forced to travel in upwardly and outwardly diverging paths by the director members which engage them and are confined in the inclined slots 52, 53, 56 and 57. As a result, the extremities of the brake bands, coincident with the consequent downward movement of the bands permitted by the slidably mounted follower bar 31, are caused to assume a new position lying along a substantially true circle of greater diameter. If the frictional resistance offered by the wheels varies between them for any cause, the equalizer bars will permit a relative movement of the brake bands until the braking effort is equally distributed.

Referring now more particularly to Figs. 4 to 8 inclusive, there is shown a modified embodiment of this invention as applied to a dirigible dual wheel assembly. As there embodied, a yoke 80 having a wheel spindle 81 and steering knuckle 82 is pivotally supported upon an axle 83 by a king pin 84. A roller bearing 85 on the spindle 81 supports the inboard end of the outer wheel hub 86 of the pair, the other or inner wheel 87 thereof being journalled on the hub 86.

The hub 86 of the outer wheel carries a brake drum 88 bolted thereto as at 89 and the inner wheel carries a brake drum 90 bolted to an apertured or cutaway annular flange 91 as at 92.

A brake support member 93 is bolted at its top and bottom to the yoke 80 by bolts 94 and is provided with a slotted arm 95 in which is mounted slidably a follower member 96 similar in all respects and function to the follower member 31 of Fig. 1.

Brake bands 97 and 98 are pivotally supported on the follower member 96 on opposite sides of the arm 95 and are pivotally connected at their extremities to the brake support member 93 which is centrally apertured to permit the passage of the spindle 81 therethrough.

Pivotal connection of the brake band extremities with the brake support member is effected by means of equalizer members one of which is shown in Fig. 8. An equalizer member, as there embodied, consists of an angular U-shaped director member or guide link 99 between whose legs is rotatably mounted a roller 100 of cylindrical contour and from whose top extends a shaft 101 upon which is journalled an equalizer bar 102. A lock ring 103 prevents accidental separation of the bar and member and a spring connection 104 extends from the director member 99 in axial alignment with the shaft of the roller 100. The equalizer bar 102 has tip portions of spherical contour.

As is best shown in Figs. 5 and 6, the equalizer members are pivotally mounted on the brake support member 93 between the brake bands 97 and 98 with the legs of the director member 99 straddling an ear 105 of the brake support member to which the director member is pivotally connected by a shaft 106. A helical spring 107 is connected at either end to the lugs 104 so as to draw the director members toward each other.

The spherical end portions of the equalizer bars 102 are closely fitted within apertures 108 in the brake bands 97 and 98 at their extremities. The brake bands are maintained in initially spaced relation by the central shoulder portion of the equalizer bar, but it is apparent that if one end of one brake band is held, the corresponding end of the other may nevertheless be moved substantially parallelly therewith because the equalizer bar will pivot about the end in the held band. Thus equal distribution of the braking effort is obtainable.

Separation of the brake bands is restrained by helical springs 109 coupling the bands adjacent their ends.

The outward and upward movement of the opposed ends of each brake band is obtained in the embodiment of Fig. 5 by having the axes of the pins 106 spaced from each other a greater distance than the axes of the equalizer bars 102. As here embodied, the angularity of the U-shaped director members or guide links 99 attains this end as well as providing a more compact structure.

The expansion of the brake bands is effected by the rotation of a two lobed cam 110 provided at one end of a shaft 111 journalled in a fitting 112 secured to the brake support member 93 by bolts 113. Thus, as the shaft 111 is rotated, the cam lobes which engage the rollers 100 cause them and the director members to move away from each other so that the equalizer bars move in outwardly and upwardly diverging arcs concentric with the axes of the shafts 106. Since the arcs are relatively short, the movement of the equalizer bars is substantially linearly outward and upward. This movement coupled with the coincident downward movement of the brake bands made possible by the follower member 96, Fig. 7, is effective to preserve the circular contour of the brake bands at differing diameters and ensure more uniform contact of the bands with the brake drums throughout the circumference of the latter.

Referring now more particularly to Figs. 9 and 10, there is shown the dirigible dual wheel assembly of Figs. 4 and 5 with a single wide brake band 114 in lieu of the side-by-side bands of Fig. 4. The brake band is faced with a pair of brake linings 115 and 116, respectively, rather than with a single wide lining, for reasons of economy and the brake band is slidably supported on the brake member 93 as in Fig. 5.

The ends of the brake band are resiliently restrained by means of a helical spring 117 secured at its ends to a pair of cam followers 118 and 119, respectively, extending inwardly from the brake band adjacent its ends. The cam followers are faced, respectively, with a narrow strip of bearing metal adapted to be engaged by one lobe of the two lobed cam 110 which is carried on the shaft 111 journalled in the fitting 112. The fitting 112 is bolted to the brake support member 93 as at 113 and is pivotally connected by a pin 120 to one end of a director member 121 whose other end is pivotally connected to the cam follower 119 by a pin 122. The fitting 112 and cam follower 118 are similarly pivotally connected by a director member or guide link 123 and pins 124 and 125. The pins 120 and 124 are more widely separated than the pins 122 and 125. Hence, the pins 122 and 125 must follow arcs extending upwardly and outwardly as must the ends of the brake band 114. The circular contour of the brake band is thus preserved during expansion. Equalization of the braking effort as between the drums 88 and 90 is obtained in a fair degree by the relative expansion characteristics of the two drums. The drum 90 being less rigidly supported than the drum 88 in that it has two free circumferential edges, can expand more easily than the drum 88 and hence tend to equalize any difference in the braking effort as applied by the wide single brake band.

It will be observed that certain features and sub-combinations are of utility and may be employed without reference to other features and sub-combinations. This is contemplated by and is within the scope of the appended claims. It is further obvious that various changes may be made in details within the scope of the appended claims without departing from the spirit of this invention. It is, therefore, to be understood that this invention is not to be limited to the specfic details shown and described.

I claim:

1. A vehicle wheel assembly including a brake drum; a substantially continuous brake band; and, means for effecting movement of the ends of said band outwardly along outwardly diverging paths in response to a braking effort, said means comprising a director member pivotally connected to either end of said band and means engaging and fixing each director member for angular movement on an axis parallel to said pivot axis, the axes of respective director members lying in the same plane, said planes intersecting each other.

2. A vehicle wheel assembly including a brake drum; a substantially continuous brake band slidably supported intermediate its ends; and, means for effecting movement of the ends of said band outwardly along outwardly diverging paths in response to a braking effort, said means comprising a director member pivotally connected to either end of said band, and guide means having diverging linearly extending guide surfaces upon which said director members are slidably supported.

3. A vehicle wheel assembly including a brake drum; a substantially continuous brake band slidably supported intermediate its ends; and, means for effecting movement of the ends of said band outwardly along outwardly diverging paths in response to a braking effort, said means comprising a director member pivotally connected to either end of said band, said director members respectively having upper and lower parallel planar surfaces, and guide means slidably engaging said director members, said guide means having oppositely extending inclined slots whose upper and lower surfaces are planar and parallel.

4. A vehicle wheel assembly including a brake drum; a brake support member; a substantially continuous brake band slidably supported on said member intermediate its ends; and, a director member pivotally connected to either end of said band and to said support member, the pivot axes of respective director members lying in the same plane, said planes intersecting each other.

5. A vehicle wheel assembly including a brake drum; a brake support member; a substantially continuous brake band slidably and pivotally supported intermediate its ends on said member; a guide member carried by said support member, said guide member having slots diverging from each other, said slots having parallel planar upper and lower faces; a director member pivotally connected to either end of said band and situated within said slots, said director members respectively having parallel planar upper and lower faces in sliding engagement with the corresponding faces of said slots.

6. A dual wheel assembly for vehicles including side-by-side brake drums held against substantial axial movement and in coaxial relation; brake support means; angularly related guide surfaces associated with said means; substantially continuous side-by-side brake bands respectively slidably supported on said means; and, brake band guide members slidably engaging said guide surfaces.

7. A dual wheel assembly for vehicles including side-by-side brake drums held against substantial axial movement and in coaxial relation; brake support means; a substantially continuous brake band slidably mounted on said means; and, brake band guide links pivotally connecting said band and said means, said links respectively having the plane of the pivot axes of one said link intersecting a corresponding plane of another said link in brake released position.

8. A dual wheel assembly for vehicles comprising side-by-side brake drums held against substantial axial movement and in coaxial relation; brake support means; substantially continuous side-by-side brake bands respectively slidably engaging said means; and, equalizer members connecting said brake bands with said means, said members respectively comprising an equalizer bar pivotally connecting said bands, and a director member pivotally connecting said bar with said means.

9. In a dual wheel assembly, the combination including side-by-side brake drums; side-by-side brake bands; a fixed member; and, means for expanding said bands into substantially uniform contact with said drums throughout their circumference, said means comprising an equalizer bar pivotally engaging either pair of corresponding ends of said bands, said bars respectively having either end of substantially spherical contour so as to permit substantially universal pivotal movement thereof relative to the band engaged, a director member pivotally engaging either bar, said director members respectively pivotally engaging said fixed member at a distance from each other greater than the distance between each other at said bars, and means for moving said bars apart to expand said brake bands.

CHARLES S. ASH.